(12) United States Patent
Joo

(10) Patent No.: US 10,801,184 B2
(45) Date of Patent: Oct. 13, 2020

(54) HYDRAULIC BREAKER CAPABLE OF CALCULATING OPERATING TIME

(71) Applicant: DAEMO ENGINEERING CO., LTD., Siheung-si, Gyeonggi-do (KR)

(72) Inventor: Jin Moo Joo, Seoul (KR)

(73) Assignee: DAEMO ENGINEERING CO., LTD., Siheung-si, Gyeonggi-Do (KR)

( * ) Notice: Subject to any disclaimer, the term of this patent is extended or adjusted under 35 U.S.C. 154(b) by 117 days.

(21) Appl. No.: 16/073,243

(22) PCT Filed: Jan. 26, 2017

(86) PCT No.: PCT/KR2017/000955
§ 371 (c)(1),
(2) Date: Jul. 26, 2018

(87) PCT Pub. No.: WO2017/131466
PCT Pub. Date: Aug. 3, 2017

(65) Prior Publication Data
US 2019/0032307 A1 Jan. 31, 2019

(30) Foreign Application Priority Data

Jan. 28, 2016 (KR) .......................... 10-2016-0010602

(51) Int. Cl.
| | |
|---|---|
| *E02F 9/22* | (2006.01) |
| *B25D 9/26* | (2006.01) |
| *B25D 9/18* | (2006.01) |
| *G01H 1/12* | (2006.01) |

(52) U.S. Cl.
CPC .............. *E02F 9/2264* (2013.01); *B25D 9/18* (2013.01); *B25D 9/26* (2013.01); *E02F 9/2217* (2013.01); *B25D 2250/221* (2013.01); *G01H 1/12* (2013.01)

(58) Field of Classification Search
CPC ........ E02F 9/2264; E02F 9/2217; B25D 9/18; B25D 9/26; B25D 2250/221; G01H 1/12
USPC .......... 173/1–11, 176–183, 39, 200, 213, 171
See application file for complete search history.

(56) References Cited

U.S. PATENT DOCUMENTS

| | | | | |
|---|---|---|---|---|
| 3,671,837 A | * | 6/1972 | Kanno ...................... | H02P 6/20 388/843 |
| 4,108,006 A | * | 8/1978 | Walter ..................... | G01P 15/11 73/514.31 |
| 5,090,485 A | * | 2/1992 | Pomonik .................. | E21B 7/24 173/1 |
| 5,174,387 A | * | 12/1992 | Arndt ....................... | B25D 9/26 173/1 |

(Continued)

FOREIGN PATENT DOCUMENTS

| | | |
|---|---|---|
| JP | 2001-315074 A | 11/2001 |
| JP | 2008-506543 A | 3/2008 |
| KR | 10-2012-0104300 A | 9/2012 |

*Primary Examiner* — Robert F Long
(74) *Attorney, Agent, or Firm* — Novick, Kim & Lee, PLLC; Jae Youn Kim

(57) ABSTRACT

The objective of the present invention is to provide a hydraulic breaker comprising: a hydraulic breaker body part; a sensor part sensing vibration generated in the hydraulic breaker body part when objects to be crushed, including bedrocks, are crushed, so as to output a sensing signal; and a control part receiving the sensing signal so as to calculate the time for which the hydraulic breaker body part vibrates, thereby calculating an operating time.

5 Claims, 6 Drawing Sheets

(56) References Cited

U.S. PATENT DOCUMENTS

| | | | | |
|---|---|---|---|---|
| 5,860,481 A * | 1/1999 | Prokop | ............... | B25D 9/14 173/17 |
| 6,087,936 A | 7/2000 | Woods | | |
| 7,410,010 B2 * | 8/2008 | Henriksson | ............. | B25D 9/18 173/128 |
| 8,228,191 B2 | 7/2012 | Woods | | |
| 10,022,850 B2 * | 7/2018 | Lee | ............... | B25D 9/26 |
| 2002/0088678 A1 * | 7/2002 | Ruckman | ............. | F16F 15/002 188/378 |
| 2004/0182587 A1 * | 9/2004 | May | ............... | B25B 23/14 173/2 |
| 2007/0074881 A1 * | 4/2007 | Bermingham | ............. | E02D 7/02 173/2 |
| 2008/0296035 A1 * | 12/2008 | Lohmann | ............. | B25D 9/265 173/177 |
| 2010/0018494 A1 * | 1/2010 | Obermeier | ............. | G01L 9/0042 123/198 R |
| 2010/0175902 A1 * | 7/2010 | Rejman | ............. | B25D 16/006 173/1 |
| 2010/0224356 A1 * | 9/2010 | Moore | ............. | E21B 4/02 166/65.1 |
| 2012/0250815 A1 * | 10/2012 | Oksman | ............. | B25D 9/00 377/16 |
| 2013/0000938 A1 * | 1/2013 | Matsunaga | ............. | B25B 21/008 173/181 |
| 2013/0056235 A1 * | 3/2013 | Pozgay | ............. | B25B 21/00 173/29 |
| 2013/0062088 A1 * | 3/2013 | Mashiko | ............. | B25B 21/02 173/2 |
| 2013/0126202 A1 * | 5/2013 | Oomori | ............. | B25B 21/00 173/217 |
| 2013/0133912 A1 * | 5/2013 | Mizuno | ............. | B25B 23/1405 173/180 |
| 2014/0306574 A1 * | 10/2014 | Twerdochlib | ............. | H02K 1/16 310/216.129 |
| 2014/0352996 A1 * | 12/2014 | Austefjord | ............. | H02M 5/12 173/217 |
| 2016/0279775 A1 * | 9/2016 | Lee | ............. | E21C 31/02 |
| 2018/0209085 A1 * | 7/2018 | Xu | ............. | D06F 37/20 |
| 2018/0252576 A1 * | 9/2018 | Arihara | ............. | F04D 29/66 |

\* cited by examiner

HYDRAULIC BREAKER CAPABLE OF CALCULATING OPERATING TIME

TECHNICAL FIELD

The present invention relates generally to a hydraulic breaker capable of calculating an operating time.

BACKGROUND ART

Generally, a hydraulic breaker is used to crush bedrocks. The hydraulic breaker includes a reciprocating piston, a housing having a cylinder bore, and a pressure accumulator, which is pressurized to a pre-load pressure to protect the hydraulic breaker from a fluid cavity and a pressure gradient and to increase operation performance of the hydraulic breaker, as well as to transmit kinetic energy generated by impact of the piston to a chisel so that a chisel tip can crush bedrocks using the kinetic energy.

Although the hydraulic breaker may have a breakdown due to vibrations caused by long-time use for breaking rock, in general, there is no method to check an operating time of the hydraulic breaker.

Cited Document 1 below discloses a system and a method for diagnosing a failure of a hydraulic system of a clutch for AMT by comparing a delayed time to reach target driving torque with a reference time to reach target driving torque. However, the Document does not disclose ensuring of the service life of the hydraulic system.

DISCLOSURE

Technical Problem

Accordingly, an object of the present invention is to provide a hydraulic breaker capable of calculating an actual operating time thereof so as to ensure the service life thereof.

Technical Solution

In a first embodiment, the present invention provides a hydraulic breaker including: a body unit; a sensor unit sensing vibration generated in the body unit when objects to be crushed, including bedrocks, are crushed, so as to output a sensing signal; and a control unit receiving the sensing signal so as to calculate a time for which the body unit vibrates, thereby calculating an operating time.

Additionally, the body unit includes: a cylinder; a piston received in the cylinder to axially reciprocate in the cylinder, wherein the piston has a first piston face oriented such that pressure is applied in a returning stroke direction, a second piston face oriented such that pressure is applied in an advancing stroke direction, and a circumferential space disposed between the first piston face and the second piston face; a chisel operated to impact and crush bedrocks using a reciprocating motion of the piston; a pressure conduit configured to provide working pressure through an outlet thereof connected to the cylinder; a reducing return conduit configured to reduce pressure through an outlet thereof connected to the cylinder; a control valve having a control plunger therein, a small control plunger surface operated to move the control plunger to a returning stroke position, and a large control plunger surface larger than the small control plunger surface, the large control plunger surface being operated to move the control plunger to an advancing stroke position or the returning stroke position; a stroke valve having an inlet side, an outlet side, and a lower side, wherein the inlet side is connected to the pressure conduit connected to a hydraulic pump via a stroke control pressure conduit, the outlet side is connected to a turning conduit for the control valve via an additional conduit connected to the control valve, and the lower side is connected to the hydraulic pump via a hydraulic control valve actuated under the control of a receiving MCU; and a spring loaded on an upper surface of the stroke valve to reset a mechanical force in response to a change in hydraulic pressure so as to take a long stroke position from a short stroke position.

Additionally, the sensor unit further includes: a vibration sensor sensing vibration of the hydraulic breaker so as to output the sensing signal; and a wireless transmitter wirelessly outputting the sensing signal.

Additionally, the vibration sensor includes: a metal housing; a protrusion formed on an upper end of the housing; a pair of ferromagnetic biases attached below the protrusion for providing an operating point to an electronic material; a metal cap covering an upper portion of the housing; a ceramic insulator attached to an undersurface of the metal cap; a metal electrode inserted into the housing through the metal cap and the ceramic insulator; and a magnetic sphere coming into and out of contact with the metal electrode so as to produce a corresponding signal, wherein the ceramic insulator is provided to regulate a strength of the magnetic field between the metal cap and the magnetic sphere.

Additionally, the control unit includes: a wireless receiver receiving the sensing signal; a timer outputting information on measuring the operating time for which the body unit of the hydraulic breaker has been operated; a filter outputting a signal determining the magnitude of a sensing signal; and a calculator receiving the operating time from the timer and the signal determining the magnitudes of the sensing signals from the filter and calculating the operating time of the body unit of the hydraulic breaker.

Advantageous Effects

According to the present invention, the operating time of the hydraulic breaker can be calculated so as to ensure the service life of the hydraulic breaker, so that if the hydraulic breaker has a breakdown before the ensured service life, the breakdown can be fixed without disposal, thereby reducing maintenance cost by the manufacturer or seller of the hydraulic breaker.

BEST MODE

Figure 1:
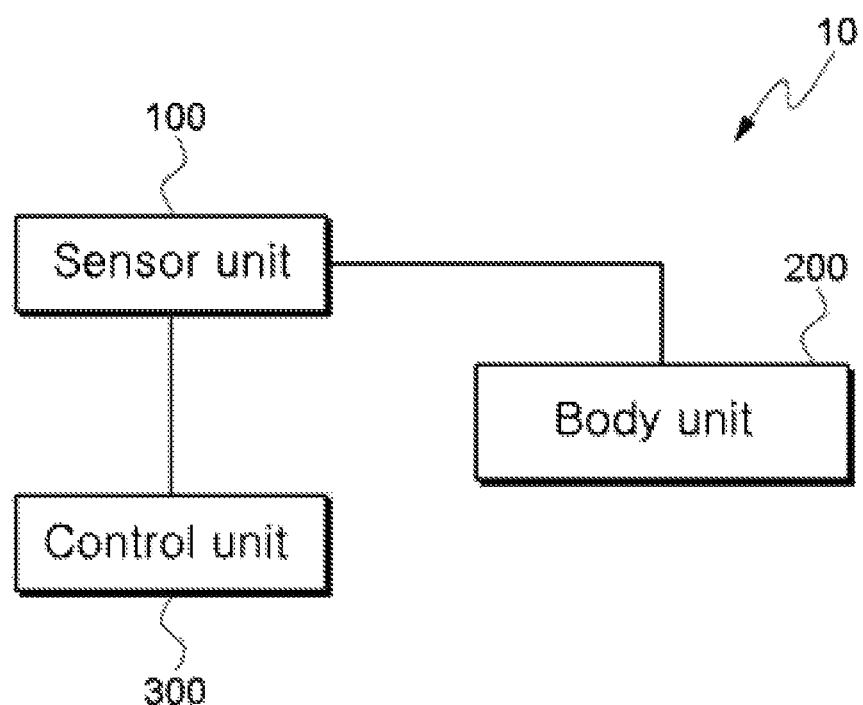
FIG. 1 is a block diagram illustrating a hydraulic breaker capable of calculating an operating time according to an embodiment of the present invention.

A technical solution of the present invention to accomplish the above object to provide a hydraulic breaker capable of calculating an operating time, as well as operational effects of the present invention will be clearly understood from the following description with reference to the accompanying drawings illustrating preferred embodiments of the invention.

In the following description, it is to be noted that, when the functions of conventional elements and the detailed description of elements related with the present invention may make the gist of the present invention unclear, a detailed description of those elements will be omitted. It will be understood that although the terms "first", "second", etc. may be used herein to describe various elements, these elements should not be limited by these terms. These terms are only used to distinguish one element from another element.

The detailed description below is provided with reference to the accompanying drawings, which illustrate exemplary embodiments implementing the invention. These embodiments are provided so that this disclosure will be thorough and complete, and will fully convey the scope of the invention to those skilled in the art. It should be understood that although various embodiments of the invention are different, the embodiments need not to be exclusive from each other. For example, specific shapes, structures, and features of elements described in an embodiment may be modified to other shapes, structures, and features without departing from the scope of the present invention. Further, positions or arrangements of individual elements which are provided in an embodiment may also be modified to other configuration without departing from the scope of the invention. Therefore, the following description is not intended to be limiting, but be illustrative. Adequately, the scope of the present invention is only defined by all of features of claims and equivalent features thereof. The same reference numerals refer to similar elements throughout the drawings.

A description will now be made to preferred embodiments of the invention with reference to the accompanying drawings in order to enable an ordinary skilled person in the art to easily implement the invention.

FIG. 1 is a block diagram illustrating a hydraulic breaker capable of calculating an operating time according to an embodiment of the present invention.

Referring to FIG. 1, a hydraulic breaker 10 may include a body unit 200, a sensor unit 100 sensing vibration generated in the body unit 200 when objects to be crushed, including bedrocks, are crushed, so as to output a sensing signal, and a control unit 300 receiving the sensing signal so as to calculate the time for which the body unit vibrates, thereby calculating an operating time.

The body unit 200 serves to impact and crush bedrocks using a reciprocating motion of a chisel which is generated by a piston. Since the body unit 200 vibrates during the operation thereof due to a motion of the piston, the time at which the body unit vibrates may be determined as the time at which the hydraulic breaker starts operating to crush bedrocks.

The sensor unit 100 may sense vibration generated in the body unit 200 so as to output a sensing signal. The sensor unit 100 may be attached to the body unit 200 of the hydraulic breaker to detect vibration generated in the body unit 200. Further, the sensor unit 199 may wirelessly transmit the sensing signal to the control unit 300. When the magnitude of the vibration generated in the body unit 200 is above a threshold value, the sensor unit 100 determines that the body unit 200 is operating, and outputs a sensing signal, and when the magnitude of the vibration is below the threshold value, the sensor unit determines that the body unit 200 stops operating, and may not output the sensing signal.

The control unit 300 may be configured to receive a sensing signal from the sensor unit 100. When receiving the sensing signal, the control unit 300 can check the time at which the sensing signal is received, so as to calculate an operating time of the body unit 200. The control unit 300 can wirelessly receive the sensing signal from the sensor unit 100. Further, when the magnitude of the sensing signal from the sensor unit 100 is above a threshold value, the control unit 300 can determine that the body unit is operating, and when the magnitude of the sensing signal from the sensor unit 100 is below the threshold value, the control unit can determine that the body unit 200 stops operating.

Further, the control unit 300 can display the calculated operating time for which the hydraulic breaker has been operated. The operating time may include individual operating times for which the hydraulic breaker intermittently operates from the start to stop point, and a total operating time of the hydraulic breaker. In addition, only the operating time for which the hydraulic breaker is crushing bedrocks may be displayed. The displayed time, however, may not be limited thereto. The control unit 300 may store the operating time therein.

Figure 2:
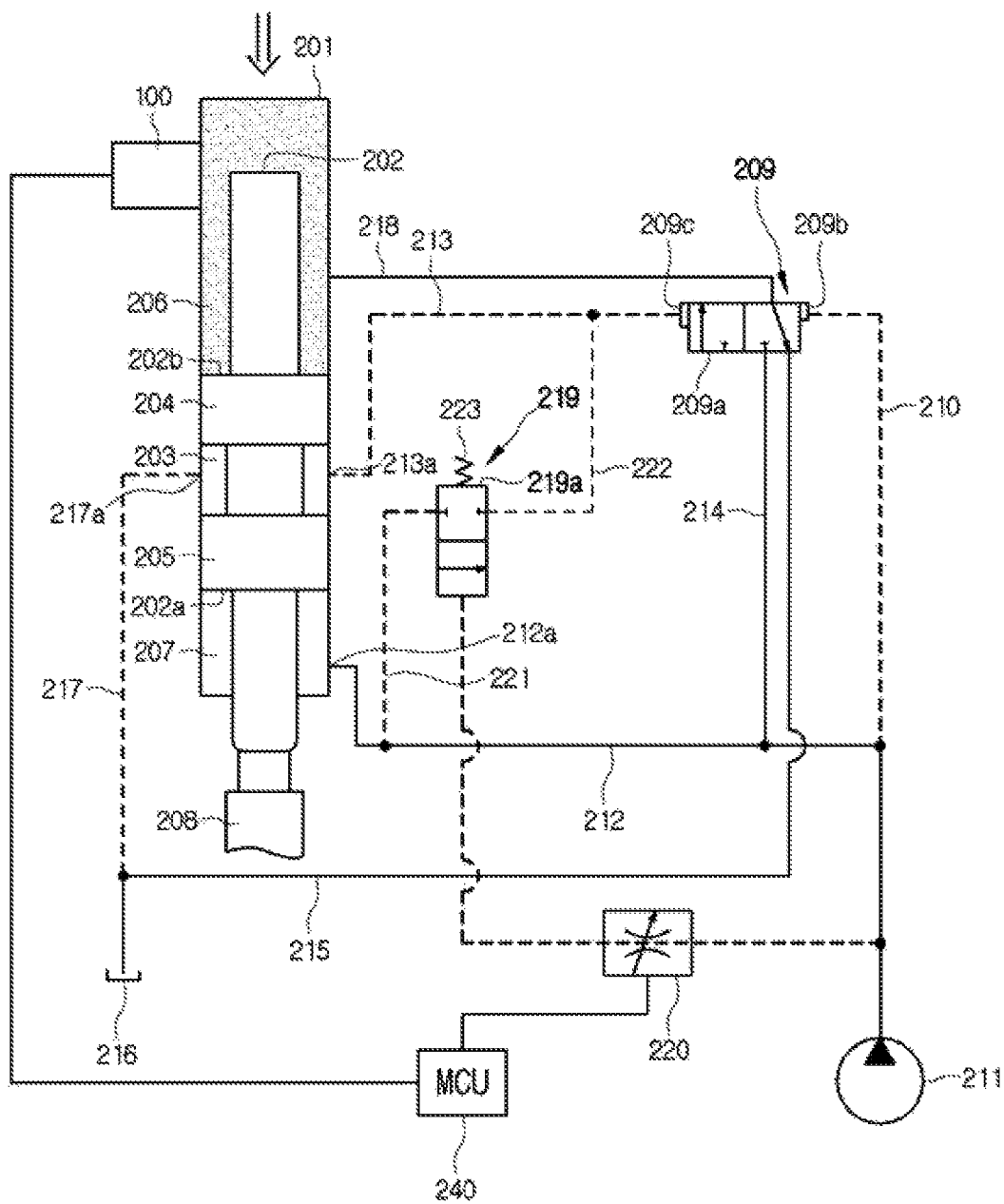
FIG. 2 is a diagram illustrating a structure of a body unit of the hydraulic breaker shown in FIG. 1.

FIG. 2 is a diagram illustrating a structure of a body unit of the hydraulic breaker shown in FIG. 1.

Referring to FIG. 2, the body unit 200 of the hydraulic breaker may include a hollow cylinder 201 and a piston 202 which is received in the cylinder 201 and axially reciprocates in the cylinder. The piston 202 may have front and rear guide parts 205, 204, which are separated from each other with a circumferential space 203 interposed therebetween. The front and rear guide parts respectively have, on laterally-opposite sides from the circumferential space 203, first and second piston faces 202a, 202b, which define front and rear cylinder chambers 207, 206, respectively. Here, the first piston face 202a may have an area smaller than that of the second piston face 202b. A forward stroke direction of the piston 202 is denoted by double-lined arrow.

The sensor unit 100 is attached to one side of an outer wall of the cylinder 201, and a stroke section such as a chisel 208 is attached to a distal end of the piston out of the cylinder 201. In a normal operation where the chisel 208 does not reach and crush bedrocks, the piston 202 has a normal stroke position.

A controller for switching an operation of the piston 202 has a control plunger 209a which is displaceable in a control valve 209. The control plunger 209a has a small control plunger surface 209b operated to move the control plunger to a returning stroke position and a large control plunger surface 209c larger than the small control plunger surface 209c, the large control plunger surface 209c being operated to move the control plunger to an advancing stroke position, wherein the small control plunger surface 209b is continuously exposed to working pressure through a reset conduit 210. Working pressure is generated by a hydraulic pump 211. The first piston face 202a is also continuously exposed to working pressure through a pressure conduit 212 communicating with the reset conduit 210. The pressure conduit 212 is mounted to the cylinder 201 such that an outlet 212a thereof is continuously disposed in the front cylinder chamber 207.

In a normal operation, the large control plunger surface 209c of the control plunger 209a is connected to the cylinder 201 via a turning conduit 213 such that an outlet 213a thereof communicates with a reducing return conduit 217 through the circumferential space 203.

The control valve 209 is connected to the pressure conduit 212 via a control conduit 214, on one side, and to a tank 216 via a return conduit 215, on the other side, wherein the control valve is connected to the cylinder 201 via the reducing return conduit 217, an outlet 217a of which is connected to the return conduit 215 via the circumferential space 203. Thus, the outlet 217a of the reducing return conduit 217 and the outlet 213a of the turning conduit 213 are separated from each other by a distance that is smaller than an axial length of the circumferential space 203.

Further, the control valve 209 is connected to the rear cylinder chamber 206 via a relief pressure conduit 218. The second piston face 202b is exposed to working pressure which may be fed to the rear cylinder chamber 206 via the relief pressure conduit 218.

The control valve 209 may have two valve positions. The valve position may include a returning stroke position (right side) where pressure applied to the second piston face 202b is reduced via the relief pressure conduit 218 and the return conduit 215, and an advancing stroke position (left side) where the working pressure is applied to the rear cylinder chamber 206 via the pressure conduit 212, the control conduit 214 connected to the pressure conduit 212, and the relief pressure conduit 218. As a result, the piston 202 is actuated in the double-lined arrow direction against reset pressure applied to the first piston face 202a.

In the meantime, the hydraulic breaker 10 of the invention includes a stroke valve 219 that may have a long stroke position and a short stroke position.

The operation of the stroke valve 219 is determined in response to pressure that is applied by a flow control valve 220 such as a solenoid valve and an electric proportional pressure reducing (EPPR) valve operated under the control of a receiving MCU 240.

An inlet side of the stroke valve 219 is connected to the pressure conduit 212 via a stroke control pressure conduit 221, and an outlet side of the stroke valve 219 is connected to the turning conduit 213 for the control valve 209 via an additional conduit 222.

As illustrated, when the flow control valve 220 installed at a conduit opens under the control of the receiving MCU 240, a volume of pressure is fed through the open stroke valve 219 so that the piston 202 operates in a short stroke, and when the flow control valve 220 shuts under the control of the receiving MCU 240, the pressure is not fed through the stroke valve 219 so that the piston 202 operates in a long stroke.

Here, reference numeral 223 indicates a spring, which is loaded on an upper surface 219a of the stroke valve 219 so as to reset mechanical force in response to a change in the hydraulic pressure so as to take a long stroke position from a short stroke position.

The MCU 240 is connected to the sensor unit 100 and the flow control valve 220, for controlling an operation of the flow control valve 220, and may be the control unit 300 of FIG. 1, or part thereof.

Figure 3:
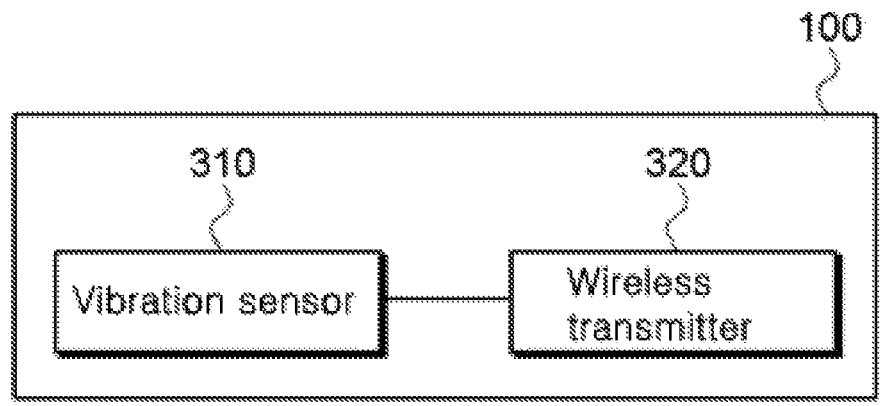
FIG. 3 is a block diagram illustrating a configuration of a sensor unit shown in FIG. 1.

FIG. 3 is a block diagram illustrating a configuration of a sensor unit shown in FIG. 1.

Referring to FIG. 3, the sensor unit 100 may include a vibration sensor 310 which senses vibration of the hydraulic breaker 10 so as to output a sensing signal s1 corresponding to a vibration signal v1, and a wireless transmitter 320 which wirelessly outputs the sensing signal s1.

The vibration sensor 310 may be configured such that it may or may not output a sensing signal s1 depending on whether vibration has been generated or not. The sensor unit 100 may wirelessly output the sensing signal using the wireless transmitter 320. The sensor unit 100 may be attached to the body unit 200 of the hydraulic breaker 200 in which vibration is generated, and the control unit 300 may also be located near the vibration-generating site to receive the sensing signal s1 and determine the operation time the hydraulic breaker has been operating. Since the sensor unit 100 wirelessly transmits the sensing signal s1, it is not electrically affected by a transmission line.

Figure 4:
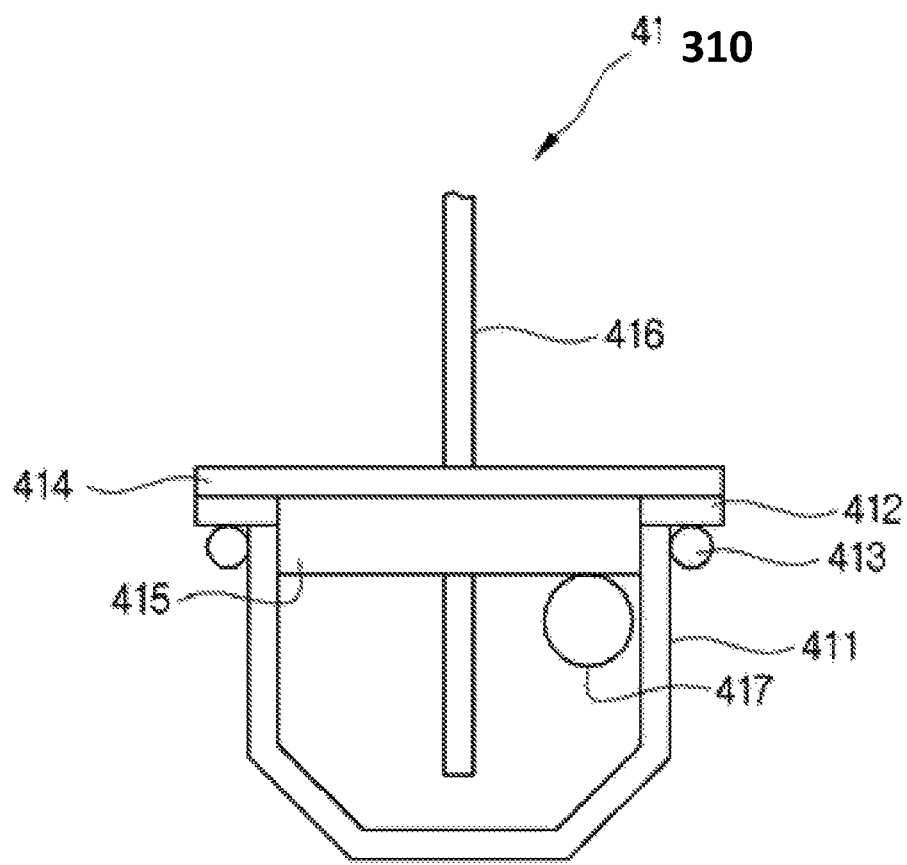
FIG. 4 is a diagram illustrating a vibration sensor shown in FIG. 3 when the hydraulic breaker is stopped according to an embodiment.
Figure 5:
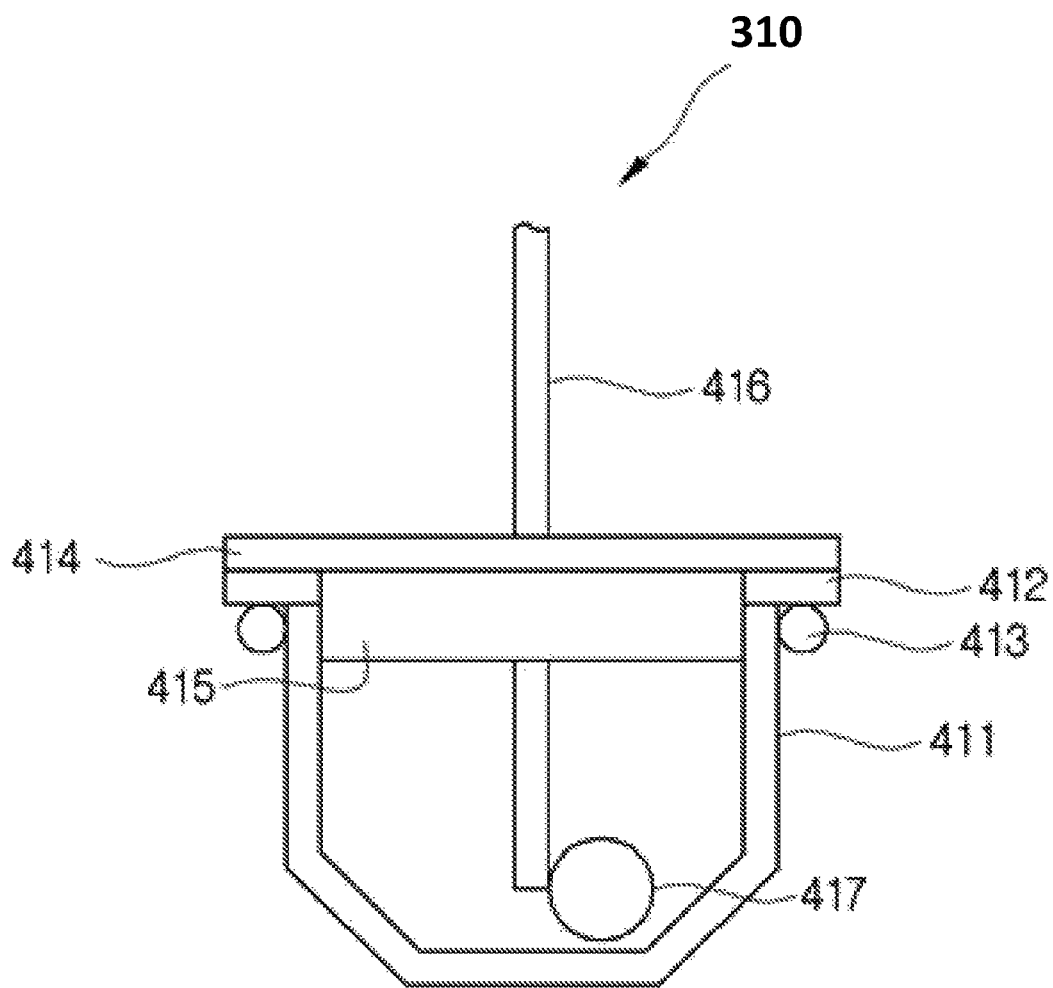
FIG. 5 is a diagram illustrating the vibration sensor shown in FIG. 3 when the hydraulic breaker is operated according to an embodiment.

FIG. 4 is a diagram illustrating a vibration sensor shown in FIG. 3 when the hydraulic breaker is stopped according to an embodiment, and FIG. 5 is a diagram illustrating the vibration sensor shown in FIG. 3 when the hydraulic breaker is operated according to an embodiment.

Referring to FIGS. 4 and 5, the vibration sensor 310 may includes a metal housing 411, a protrusion 412 formed on an upper end of the housing 411, a pair of ferromagnetic biases 413 attached below the protrusion 412 for providing an operating point to an electronic material, a metal cap 414 covering an upper portion of the housing 411, a ceramic insulator 415 attached to an undersurface of the metal cap 414, a metal electrode 416 inserted into the housing 411 through the metal cap 414 and the ceramic insulator 415; and a magnetic sphere 417 coming into and out of contact with the metal electrode 416 so as to produce a corresponding signal, wherein the ceramic insulator 415 is provided to regulate a strength of the magnetic field between the metal cap 414 and the magnetic sphere 417.

The vibration sensor 310 operates such that, when the hydraulic breaker does not operate, as shown in FIG. 4, the magnetic sphere 417 moves towards and contacts the ceramic insulator 415 attached to the undersurface of the metal cap 414 under the magnetic field applied between the metal cap 414 and the magnetic sphere 417, and when the hydraulic breaker operates, the magnetic sphere 417, which has contacted the ceramic insulator 415 attached to the undersurface of the metal cap 414, is separated from the ceramic insulator 415 due to vibration of the hydraulic breaker and comes into contact with the metal electrode 416 positioned in the housing 411, thereby generating a corresponding signal. That is, when the magnetic sphere 417 is in contact with the metal electrode 416, the signal is generated, and when the magnetic sphere 417 is not in contact with the metal electrode 416, the signal is not generated. Thus, vibration generated during the operation of the chisel 308 causes connection and disconnection between the magnetic sphere 417 and the metal electrode 416, which serves as a switch to intermittently generate a signal, so that the number of operating strokes of the piston 202 of the hydraulic breaker 10 can be measured.

Figure 6:
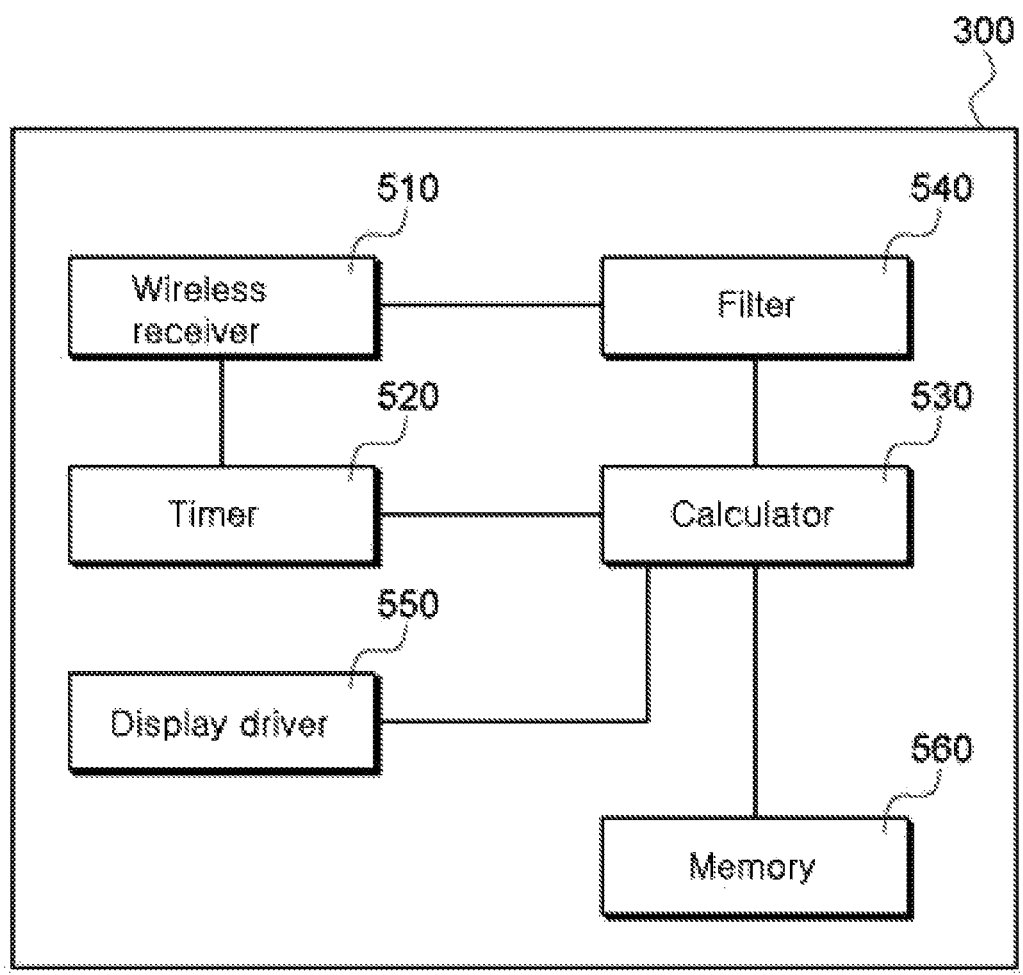
FIG. 6 is a block diagram illustrating a control unit shown in FIG. 1.

FIG. 6 is a block diagram illustrating a control unit shown in FIG. 1.

Referring to FIG. 6, the control unit 300 may include a wireless receiver 510 receiving a sensing signal s1, a timer 520 outputting information on measuring the operating time for which the body unit 200 of the hydraulic breaker has been operated; a filter 540 outputting a signal determining the magnitudes of the sensing signals S1; and a calculator 530 receiving the operating time from the timer 520 and the signal determining the magnitudes of the sensing signals from the filter 540 so as to calculate the operating time (T1 to T5) that the body unit of the hydraulic breaker 200 has been operated.

The wireless receiver 510 may receive the sensing signal s1, which is wirelessly transmitted from the sensor unit 100. The timer 520 may count a period of time from a point at which the sensing signal s1 is received to a point at which the sensing signal s1 is not received. Here, the calculator 530 can calculate an operating time that the hydraulic breaker 10 has been actually operated, by using the point at which the sensing signal s1 is received from the timer 520, and the point at which the sensing signal s1 is not received from the timer. Further, the control unit 300 may further include a filter 540, which checks whether the sensing signal s1 has been generated or not. Here, if the magnitude of the wirelessly-received sensing signal s1 is below a threshold value, the filter can determine that the sensing signal s1 has not been generated. Here, the magnitude of the sensing signal s1 can be checked by using the number of the sensing signals generated in a predefined period of time. That is, if the number of vibrations being generated is above the threshold value, it can be determined that the hydraulic breaker 10 has been operated.

The control unit 300 may also include a display driver 550, which is connected to a display unit so as to allow the display unit to display the operating time calculated by the calculator 530. The display driver 550 allows the display unit to separately display a current operating time and a total of operating time. The control unit 300 may also include a memory 560, which may be configured to store the operating time from the calculator 530, and to calculate a total of operating time by adding all of the stored operating time and currently received operating time from the calculator 530.

Figure 7:
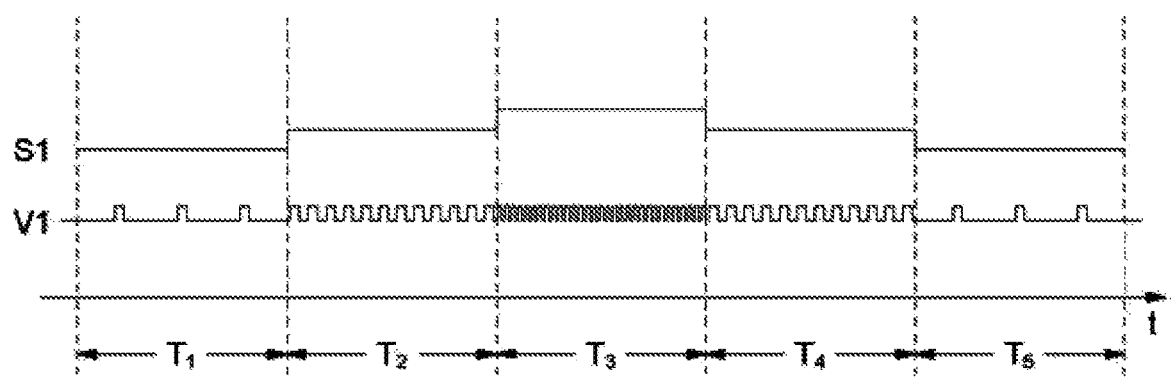
FIG. 7 is a timing chart illustrating a procedure of calculating the operating time based on the sensed signal output from the sensor unit shown in FIG. 1

FIG. 7 is a timing chart illustrating a procedure of calculating the operating time by the control unit based on the sensed signal output from the sensor unit shown in FIG. 1

Referring to FIG. 7, when the body unit 200 of the hydraulic breaker is not operated, the sensor unit 100 does not vibrate, so it does not output a sensing signal s1. In this case, when the sensor unit 100 has the vibration sensor 310 as shown in FIG. 3, the magnetic sphere 417 is in contact with the ceramic insulator, so that the vibration sensor 310 may not generate a vibration signal v1 and a corresponding sensing signal s1, or otherwise may output a sensing signal with a level below a threshold value (T1). When the body unit 200 of the hydraulic breaker starts operating, vibration is generated due to the operation of the piston, so that the sensor unit 100 can detect the vibration of the body unit 200 of the hydraulic breaker. If the magnitude of vibration is above a threshold value, the sensor unit 100 may determine that the body unit 200 is operating, and output a corresponding sensing signal s1. In the case where the sensor unit 100 has the vibration sensor 310 as shown in FIG. 4, when the body unit 200 of the hydraulic breaker vibrates, the magnetic sphere 417, which has been in contact with the ceramic insulator 415, is separated from the ceramic insulator 415 and repeatedly comes into and out of contact with the metal electrode 416 received in the housing 411, thereby repeatedly generating on/off vibration signals v1. In addition, a sensing signal s1 corresponding to the vibration signal v1 may be output with a level above a threshold value (T2). When the body unit 200 is transported to a site of bedrocks and starts crushing bedrocks, vibration is intensified. In this case, where the sensor unit 100 has the vibration sensor 310 as shown in FIG. 3, the number of the magnetic sphere 417 being brought into/out of contact with the metal electrode 416 may increase so as to make an on/off cycle of the signal having on/off waveforms shorter. Thus, the magnitude of the sensing signal s1 can be further increased (T3). When the crushing of bedrocks is completed, the magnitude of the sensing signal s1 output from the sensor unit 100 may be lowered. In a case where the sensor unit 100 has the vibration sensor 310 as shown in FIG. 4, the number that the magnetic sphere 417 is brought into/out of contact with the metal electrode 416 may decrease so as to make an on/off cycle of the vibration signal v1 having on/off waveforms longer. Thus, the magnitude of the sensing signal s1 can be further decreased (T4). When the body unit 200 of the hydraulic breaker is stopped, the body unit 200 does not vibrate, so that the sensor unit 100 may not output a sensing signal. In a case where the sensor unit 100 has the vibration sensor 310 as shown in FIG. 3, the body unit 200 does not vibrate and the magnetic sphere 417 comes into contact with the ceramic insulator 415, so that the sensing signal may not be output any more, or otherwise it may be output with a level below a threshold value (T5).

Then, the control unit 300 may receive a sensing signal s1 from the sensor unit 100 so as to calculate an operating time of the body unit 200 of the hydraulic breaker. When receiving the sensing signal s1, the control unit 300 can determine that the body unit 200 has been operated. Further, when the sensing signal s1 is not received for a predefined period of time or more, or the sensing signal is received with a level below a threshold value, the control unit can determine that the body unit has been stopped. Further, the control unit 300 can calculate an operating time for which the body unit 200 has been operated by using a difference between a point at which the body unit 200 is determined as having been stopped and a point at which the body unit is determined as having been operated. Further, the control unit 300 can calculate a cumulative operating time of the body unit 200 by adding all of operating times. Further, the control unit 300 can calculate a crushing time by calculating the time for which the body unit crushes bedrocks, from the operating time. Here, the operating time of the hydraulic breaker 10 can be calculated by adding time periods of T2 to T4, and the crushing time of the hydraulic breaker can be calculated by using the time period of T3 only. However, the calculation of the operating time is not limited thereto. The operating time including the actuating time may be checked by using the display driver 550 shown in FIG. 6.

Functions of various elements illustrated in the drawings of the invention may be provided by using dedicated hardware, as well as hardware capable of executing software in association with proper software. When provided by a processor, the functions may be provided by a single dedicated processor, a single shared processor, or partially shared individual processors.

In claims of the invention, elements described as a means for performing specific functions include any methods capable of performing the specific functions, and such elements may include a combination of circuit elements performing specific functions, or any type of software including firmware, microcode, etc. combined with proper circuits for executing software for performing specific functions.

As used herein, the expression "one embodiment" or the like, and derivatives thereof mean that specific features, structures, characteristics, or the like in relation to the embodiment are included in at least one of embodiments regarding the principle of the invention. Thus, the expressions "one embodiment" and other modifications disclosed throughout the specification do not necessarily indicate the same embodiments.

As used herein, the term "connected to" and its derivatives mean that one element is connected directly to another element, or otherwise connected indirectly to another element via other element. As used herein, the singular forms are intended to include the plural forms as well, unless the context clearly indicates otherwise. It will be further understood that the terms "comprises" and/or "comprising" or "includes" and/or "including" when used in this specification, specify the presence of stated elements, steps, operations, and devices, but do not preclude the presence or addition of one or more other elements, steps, operations, and devices.

The invention claimed is:

1. A hydraulic breaker capable of calculating an operating time, the hydraulic breaker comprising:
a body unit;
a sensor unit attached to the body unit, the sensor unit including a vibration sensor configured to output a sensing signal corresponding to a vibration signal when sensing vibration generated in the body unit, and a wireless transmitter configured to wirelessly output the sensing signal output from the vibration sensor; and
a control unit configured to receive the sensing signal from the wireless transmitter of the sensing unit so as to calculate:
a first operating time for which no sensing signal is generated or the sensing signal having a level below a threshold value is transmitted;
a second operating time for which a magnetic sphere of the vibration sensor repeatedly comes into and out of contact with a metal electrode and the sensing signal having a level above the threshold value is transmitted;
a third operating time for which the number of the magnetic sphere of the vibration sensor being brought into and out of contact with the metal electrode increases and the sensing signal having a level above the threshold valve is transmitted; and
a fourth operating time for which the number of the magnetic sphere of the vibration sensor being brought into and out of contact with the metal electrode decreases and the sensing signal with a level above the threshold value is transmitted,
wherein the body unit includes:
a cylinder;
a piston received in the cylinder to axially reciprocate in the cylinder, the piston having:
a first piston face oriented such that pressure is applied in a returning stroke direction, a second piston face oriented such that the pressure is applied in an advancing stroke direction, and a circumferential space disposed between the first piston face and the second piston face;
a chisel operated to impact and crush bedrocks using a reciprocating motion of the piston;
a pressure conduit configured to provide working pressure through an outlet thereof connected to the cylinder;
a reducing return conduit configured to reduce the working pressure through an outlet thereof connected to the cylinder;
a control valve having a control plunger therein, being provided with a small control plunger surface operated to move the control plunger to a returning stroke position, and a large control plunger surface larger than the small control plunger surface, the large control plunger surface being operated to move the control plunger to an advancing stroke position;
a stroke valve having an inlet side, an outlet side, and a lower side, wherein the inlet side is connected to the pressure conduit via a stroke control pressure conduit, the outlet side is connected to a turning conduit for the control valve via an additional conduit, and the lower side is connected to a hydraulic pump via a conduit at which a flow control valve actuated under a control of the control unit is disposed, wherein the control unit is connected to the sensor unit and the flow control valve for controlling opening and closing operations of the flow control valve; and
a spring loaded on an upper surface of the stroke valve to reset a mechanical force in response to a change in hydraulic pressure so as to take a long stroke position from a short stroke position.

2. The hydraulic breaker according to claim 1, wherein the vibration sensor comprises:
a metal housing;
a protrusion formed on an upper end of the metal housing;
a pair of ferromagnetic biases attached below the protrusion for providing an operating point to an electronic material;
a metal cap covering an upper portion of the metal housing;
a ceramic insulator attached to an undersurface of the metal cap;
the metal electrode penetrated into the housing through the metal cap and the ceramic insulator; and
the magnetic sphere coming into and out of contact with the metal electrode so as to produce a corresponding signal,
wherein the ceramic insulator is configured to regulate a strength of the magnetic field between the metal cap and the magnetic sphere.

3. The hydraulic breaker according to claim 1, wherein the control unit comprises:
a wireless receiver configured to receive the sensing signal corresponding to the number of vibrations from the wireless transmitter;
a timer configured to receive the sensing signal from the wireless receiver and output information on measured times including a time measured at a point when the sensing signal from the wireless receiver is transmitted and a time measured at a point when no sensing signal is transmitted;
a filter configured to receive the sensing signal corresponding to the number of vibrations from the wireless receiver and output a signal determining the magnitude of the sensing signal;
a calculator configured to receive the information on the measured times from the timer and receive the signal determining the magnitude of the sensing signal from the filter so as to calculate a current operating time corresponding to the number of vibrations of the hydraulic breaker; and
a memory configured to receive and store the current operating time from the calculator.

4. The hydraulic breaker according to claim 3, wherein the control unit further comprises a display driver to display the current operating time.

5. The hydraulic breaker according to claim 4, wherein the display driver is configured to display the current operating time calculated by the calculator and a total amount of operating time calculated by adding the operating time stored in the memory to the current operating time.

* * * * *